(12) United States Patent
Hucker et al.

(10) Patent No.: US 9,543,078 B2
(45) Date of Patent: Jan. 10, 2017

(54) STRUCTURAL COMPOSITE BATTERY WITH FLUIDIC PORT FOR ELECTROLYTE

(71) Applicant: BAE Systems PLC, London (GB)

(72) Inventors: Martyn John Hucker, Bristol (GB); Jason Karl Rew, Bristol (GB); Michael Dunleavy, Bristol (GB)

(73) Assignee: BAE SYSTEMS PLC, London (GB)

( * ) Notice: Subject to any disclaimer, the term of this patent is extended or adjusted under 35 U.S.C. 154(b) by 140 days.

(21) Appl. No.: 14/407,573

(22) PCT Filed: Jun. 6, 2013

(86) PCT No.: PCT/GB2013/051494
§ 371 (c)(1),
(2) Date: Dec. 12, 2014

(87) PCT Pub. No.: WO2013/186535
PCT Pub. Date: Dec. 19, 2013

(65) Prior Publication Data
US 2015/0187517 A1    Jul. 2, 2015

(30) Foreign Application Priority Data
Jun. 14, 2012    (GB) .................................. 1210514.4

(51) Int. Cl.
*H01M 6/32*    (2006.01)
*H01M 2/14*    (2006.01)
(Continued)

(52) U.S. Cl.
CPC ................ *H01G 11/52* (2013.01); *H01G 9/12* (2013.01); *H01G 11/18* (2013.01); *H01G 11/64* (2013.01); *H01G 11/84* (2013.01); *H01M 2/1264* (2013.01); *H01M 2/1606* (2013.01); *H01M 2/168* (2013.01); *H01M 2/1673* (2013.01);
(Continued)

(58) Field of Classification Search
CPC .................................. H01M 2/16; H01M 2/14
See application file for complete search history.

(56) References Cited

U.S. PATENT DOCUMENTS 4,842,963 A * 6/1989 Ross, Jr. ............... H01M 4/244
29/623.1

FOREIGN PATENT DOCUMENTS

| WO | 2008116248 A1 | 10/2008 |
| WO | 2011098793 A1 | 8/2011 |
| WO | 2011098795 A1 | 8/2011 |

OTHER PUBLICATIONS

PCT Search Report dated Sep. 19, 2013 of Patent Application No. PCT/GB2013/051494 filed Jun. 6, 2013, 2 pages.
(Continued)

*Primary Examiner* — Patrick Ryan
*Assistant Examiner* — Julian Anthony
(74) *Attorney, Agent, or Firm* — Maine Cernota & Rardin

(57) ABSTRACT

According to the invention there is provided a fluidic port (8-9) for a refillable structural composite electrical energy storage device (1), and a method of producing same. The device may be a battery or supercapacitor with first and second electrodes (2,3) which are separated by a separator structure (6), wherein the device contains an electrolyte (4) which may further contain active electrochemical reagents. The fluidic port allows the addition, removal of electrolyte fluids, and venting of any outgassing by products.

13 Claims, 2 Drawing Sheets

(51) Int. Cl.
| | |
|---|---|
| H01M 2/16 | (2006.01) |
| H01M 8/22 | (2006.01) |
| H01G 5/012 | (2006.01) |
| H01G 11/52 | (2013.01) |
| H01M 2/12 | (2006.01) |
| H01M 2/18 | (2006.01) |
| H01M 2/36 | (2006.01) |
| H01M 10/04 | (2006.01) |
| H01M 10/0585 | (2010.01) |
| H01G 9/12 | (2006.01) |
| H01G 11/18 | (2013.01) |
| H01G 11/64 | (2013.01) |
| H01G 11/84 | (2013.01) |
| H01M 10/28 | (2006.01) |
| H01M 4/62 | (2006.01) |
| H01M 4/02 | (2006.01) |
| H01M 4/38 | (2006.01) |
| H01M 4/42 | (2006.01) |
| H01M 4/44 | (2006.01) |
| H01M 10/24 | (2006.01) |
| H01M 10/30 | (2006.01) |

(52) U.S. Cl.
CPC ............... *H01M 2/18* (2013.01); *H01M 2/36* (2013.01); *H01M 2/362* (2013.01); *H01M 10/0413* (2013.01); *H01M 10/0585* (2013.01); *H01M 10/28* (2013.01); *H01M 2/162* (2013.01); *H01M 2/164* (2013.01); *H01M 2/1613* (2013.01); *H01M 2/1653* (2013.01); *H01M 2/364* (2013.01); *H01M 4/02* (2013.01); *H01M 4/38* (2013.01); *H01M 4/383* (2013.01); *H01M 4/42* (2013.01); *H01M 4/44* (2013.01); *H01M 4/62* (2013.01); *H01M 10/24* (2013.01); *H01M 10/30* (2013.01); *H01M 2004/021* (2013.01); *H01M 2220/20* (2013.01); *H01M 2300/0085* (2013.01); *Y02E 60/124* (2013.01); *Y02E 60/13* (2013.01); *Y02P 70/54* (2015.11); *Y10T 29/417* (2015.01)

(56) References Cited

OTHER PUBLICATIONS

GB Search Report dated Sep. 26, 2012 of Patent Application No. GB1210514.4 filed Jun. 14, 2012, 3 pages.

* cited by examiner

STRUCTURAL COMPOSITE BATTERY WITH FLUIDIC PORT FOR ELECTROLYTE

RELATED APPLICATIONS

This application is a US National Phase Application filed under 35 USC 371 of PCT Application No. PCT/GB2013/051494, filed 6 Jun. 2013, which claims the benefit of GB Applications No. 1210514, filed 14 Jun. 2012. Each of these applications is herein incorporated by reference in their entirety for all purposes.

This invention relates to the formation of refillable structural composite electrical energy storage devices.

According to a first aspect of the invention there is provided a structural composite electrical energy storage device comprising a first electrode structure, a second electrode structure, a separator structure, said structures being encapsulated in a binder matrix to form a composite, wherein the separator structure separates the first and second electrode structures respectively, wherein said device comprises at least one void between said first and second electrode structures, said void capable of being filled with an electrolyte, wherein at least one of the first and second electrodes comprises at least one fluidic port.

The separator structure which separates the first and second electrodes respectively prevents electrical short circuits whilst permitting the free passage of ions. The fluidic port allows the electrolyte to be transferred into the void. The void may be any opening, cavity, created within the device. The void may be the pores within a porous material or structural lattice, or a void created within the cured device by use of a partially bonded separator layer or a sacrificial template that is removed after curing, preferably a partially bonded separator layer.

The fluidic port allows the device to be charged/discharged with a fluidic electrolyte, such that the process of filling and draining may be achieved as and when required, and not exclusively during construction. It may be desirable to discharge the device such as, for example during transportation or routine servicing, so that the device can effectively be deactivated or at least have its energy storage capacity significantly reduced compared to when the electrolyte is present. Therefore the drained device may have a reduced hazard or lower risk and hence may be easier to handle, store or transport.

Preferably the device comprises at least two fluidic ports, such that the device may be filled under positive or negative pressure. During a positive pressure fill procedure the air in the device may be readily displaced by the fluid entering the device, via a first fluidic port, such that the displaced air may readily leave via a second fluidic port. Alternatively the device may be filled under vacuum, by applying a vacuum at one fluidic port and introducing the electrolyte at a second fluidic port. Clearly where the device has a large area, it may be advantageous to have a plurality of fluidic ports to aid charging/discharging the system in a timely manner. The at least two fluidic ports may be located on different parts of the device to reduce the occurrence of air pockets.

The fluidic port may be selected from any suitable material, such as for example metalloids, metals, alloys, plastics, polymers or composites. The material may be selected such that it is inert with respect to the electrolyte and optional active electrochemistry reagents contained therein. Preferably the fluidic port is integral with the fibre ply reinforcement. The fluidic port allows the voids in partially bonded separator structure to be filled with a fluidic electrolyte.

Care must be taken that when the fluidic port is made from a metallic or conductive material that there is no electrical short created between the first and second electrodes. The base portion of the fluidic port must terminate within the separator layer.

In a highly preferred arrangement the fluidic port may be a female bonding fastener, with an anchor assembly, preferably comprising a through hole base plate, so as to allow the flow of fluids via the fastener. Other types of through-hole collars or arrangements may alternatively be used. Typically female bonding fasteners are internally threaded bonding fasteners, which are used in fibre reinforced polymer composites (FRPC), to provide mechanical fasteners to allow facile connection, via reciprocal fastenings, to other components that may not be made from FRPC materials.

The fluidic port preferably has an anchor or flange with a plurality of holes to allow the ingress of binder to permit a strong bond with one or more fibre reinforcement plys of only one of the electrodes or separator fibre ply.

In a highly preferred option the fluidic port comprises a vent system, such as a gas permeable membrane or valve.

The vent system may be integral to the fluidic port, such as a valve, which may be operated mechanically or electronically, so as to permit ready flow of fluids to charge and discharge the device, as well as allow outgassing of any by products or pressure build ups due to the expansion of the electrolyte.

Alternatively the vent system may be a removable vent system which can be applied to the fluidic port after charging the device, and/or removed before discharging the device, such that the vent system may be simplified, and does not hinder charging or discharging the device.

The energy storage device may be any structural composite electrical energy storage device, such as for example a composite battery or a composite supercapacitor.

Preferably, the separator structure is formed from a composite material which includes electrically insulating fibres in a binder matrix. The insulating fibres must also be resistant to the particular chemistry of the cell. Examples of suitable electrically insulating fibres include E-glass, S2-glass, silica, UHMWPE, aramids, polypropylene, PTFE and silicon carbide.

The separator structure may include separator materials such as microporous polymer films, which may be used instead of or in combination with electrically insulating fibres in a binder matrix to aid ion transport.

The thickness of the first and second electrode structures and/or the separator structure may be conveniently varied in order to provide desired mechanical and electrical properties. These structures may be formed from one or more layers. Variation of the number of layers is one way in which the thickness of these structures may be varied.

According to a further aspect of the invention there is provided a panel on a vehicle vessel or craft comprising at least one device according to the invention.

A structural energy storage device is one which can be used in place of an existing panel or element, which forms part of a body, such as a replacement panel on a vehicle vessel or craft. A conventional disposable cell, whether in a vehicle or aircraft is exclusively an energy storage device. The devices as defined herein provide both structural support (in the same fashion as the vehicles original manufactures panel) and provide energy storage.

One advantage of transporting an electrical energy storage device in a discharged state, i.e. drained of electrolyte being present in the device, is that the device is substantially inactive, during any heated processing steps, such as curing any post processing finishing processes, such as painting or lacquering etc., which are often baked to provide the final finish The energy storage devices may then be filled after they have been transformed into a final shape. In addition, finished devices may be transported to their point of use prior to the addition of electrolyte chemicals. This not only reduces their mass for transport (so reducing costs) but increases safety as less active chemicals are present and the devices themselves are electrically inert. In the event of an accident during transport there would be less risk from chemical spills and no possibility of fire due to short circuits.

A particular application of structural electrical energy devices is seen as providing both structure and power in electrically powered vehicles, vessels or crafts, and where a source of power which does not add significantly to the weight of the system or occupy significant volume will enable the system to remain operational for longer than if conventional batteries were used or provide other performance enhancements such as higher speeds, increased manoeuvrability or increased payload capacity for example. Batteries used in this way will work well with solar cells, positioned say on the aircraft wings, which can be used to re-charge the cells in flight. Devices according to the invention may be used for example as wing skins and can be used to provide power for on board electrical systems.

The electrically insulating binder matrix material may include or consist of an open cell foam, a geopolymer or an SPE. In the latter case, the SPE may perform a dual role as both binder and electrolyte.

An energy storage device according to the invention may conveniently be made by any known manufacturing processes compatible with the cell chemistry concerned. One advantage of using these commonly used techniques is that devices of the invention may be employed to replace already existing parts made by the same techniques but not having the advantage of an energy storage device formed integral therewith.

Devices according to the invention may be used in new designs or to replace worn, damaged or outdated parts of any items which can be manufactured of a metallic material. For example, vehicles, whether land, air, space or water born, may have parts manufactured with integral cells, according to the invention. Examples of such use may include wing skins on aircraft, and in particular unmanned air vehicles, where devices according to the invention may be used to power structural monitoring equipment, control surfaces, cameras, lights etc. Where the devices may be exposed to sunlight or be otherwise connectible to photovoltaic equipment, the cells or supercapacitors may be charged using such equipment. Owing to the ability of cells in batteries or supercapacitors being able to be positioned anywhere; where the battery is a wing skin, the photovoltaic cells may be positioned adjacent the devices of the invention to avoid unnecessary wiring. Conveniently, where the device is used to replace a panel on an existing body, vehicle, vessel or craft, the device may preferably be engineered to the same dimensions as the original panel.

Further potential uses on vehicles may include body panels on hybrid or electric drive vehicles where the devices of the invention can be used to save weight and bulk, compared to conventional devices. Such devices may also find use on free flooding hydrodynamic hulls of, say, submersible remotely operated vehicles. The devices would be especially useful on any vehicle where weight or bulk was at a premium like an aircraft or a satellite. On a satellite the saving in space and bulk of devices according to the invention which could be used to power various systems would potentially be of great benefit and would likely increase the payload capability of the satellite substantially.

A further advantage of using structural energy devices according to the invention is that the mass of the replacement panels, where desired, may be distributed integrally throughout the host structure. This can be very beneficial, for example, when sudden shocks occur. Such shocks might occur, for example, for vehicles involved in collisions. Under such conditions the integral nature of the devices will prevent their tending to act as uncontained missiles. Conventional batteries, when used in military tanks or armoured carriers for example, will be liable to act as uncontained missiles during an explosion or under projectile impact. However, integrated devices according to the invention will not form separate detached objects and will avoid this problem.

An example of a device according to the invention in which rechargeable batteries are evenly distributed is internal panelling for a vehicle which may be in the form of a spall liner, as used in military vehicles. These vehicles are often used for reconnaissance patrols during which they spend a considerable time with their engines switched off on 'silent watch'. In these circumstances the batteries may be used to provide power for sensors, communications, life support, air conditioning, etc. and there must be enough residual battery power to restart the vehicle engine. The spall liners will form part of the vehicle armour but will also provide additional power without taking up any further limited internal space and will not add further weight or bulk to the vehicle. The extra weight of additional conventional batteries would normally reduce manoeuvrability and speed of the vehicle. Batteries according to the invention may also comprise external vehicle armour. The distributed nature of the batteries has the advantage of easing the design of an aircraft for the correct weight distribution. There is no parasitic mass which has to be positioned wherever space is available on the aircraft and which forms a concentrated mass which must be balanced in order to trim the aircraft and which must be wired to equipment to be powered and also to a power source. The weight of supports and packaging for the batteries may also be avoided as they will be integral with the aircraft itself. The batteries may be positioned closer to equipment to be powered as they form part of the aircraft structure and do not need separate accommodation. Thus, for example cabin interior lights may use a battery supply from cells comprising cabin panelling in which the lighting is mounted and wing lights or systems equipment may be supplied by power from batteries according to the invention comprising part of the wing structure. Instruments in the cockpit may be powered by batteries, according to the invention, comprising the instrument panel itself.

Of potential great importance would be the use of devices according to the invention in electrical or electronic equipment, in particular portable equipment such as computers, personal digital assistants (PDAs), cameras and telephones. Here mountings for such equipment such as circuit boards, casings and the like could be made according to the invention which would, again, assist in cutting down the weight and bulk of such items enabling them to be lighter, smaller and possibly cheaper, owing to the reduced part count. In addition, the perennial problem of heat dissipation in portable equipment powered by batteries/supercapacitors could be alleviated by incorporating the devices in, for example, the casing of a portable computer where they could dissipate heat much more easily with the possible avoidance of the need for cooling fans.

For energy capture applications, wind turbine casings and solar array support structures could be fabricated from batteries/supercapacitors made according to the invention to cut down on weight and bulk.

According to a further aspect of the invention there is provided a method of manufacturing a device according to any one of the preceding claims, including the steps of providing a fluidic port in a separator layer, laying up, either side of the separator structure, the first and second electrode layers, curing the device, and filling the device with electrolyte via the fluidic port, optionally fitting a gas permeable membrane to the fluidic port.

Whilst the invention has been described above, it extends to any inventive combination of the features set out above, or in the following description, drawings or claims.

Exemplary embodiments of the device in accordance with the invention will now be described with reference to the accompanying drawings in which.

Figure 1:
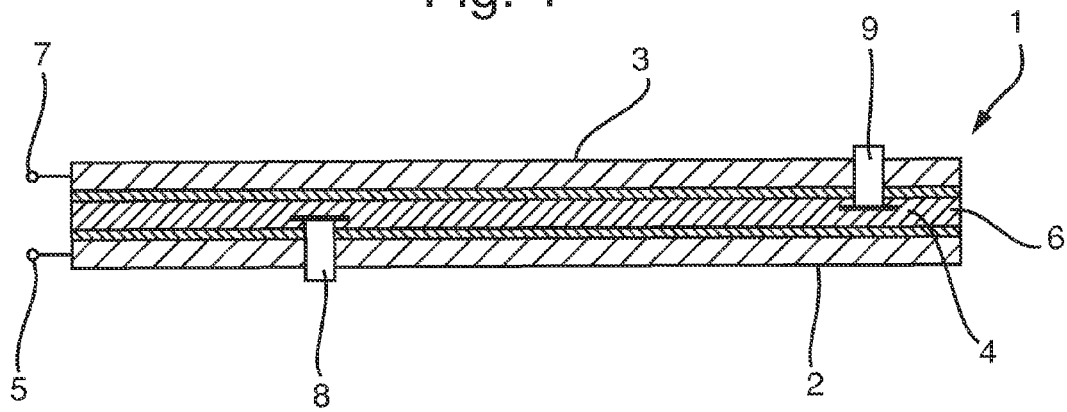
FIG. 1 shows a cross sectional side view of a composite energy storage device, with a fluid port.
Figure 4:
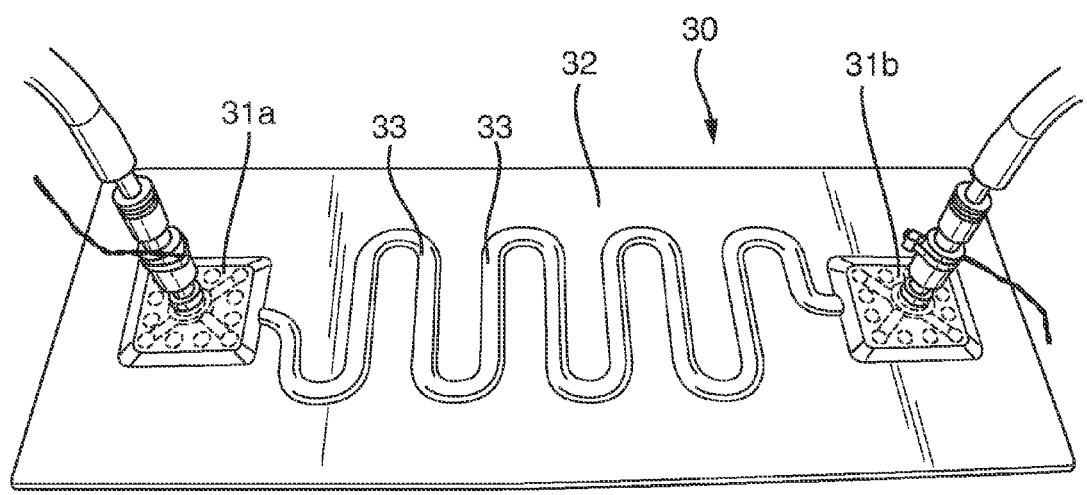

FIG. 4 shows a test rig with two fluidic ports located in a fibre reinforced polymer composite FIG. 1 shows an example of an electrical energy storage device 1, comprising a first electrode structure 2 which is spaced apart from a second electrode structure 3 by a separator structure 6. The electrodes structures 2, 3 may be connected to suitable electrode contacts 5, 7 respectively to permit charging and discharging of the device.

The electrodes 2, 3 have a fluidic ports 8, 9 respectively, to allow an electrolyte 4 to be charged in the partially bonded separator layer 6.

Figure 2:
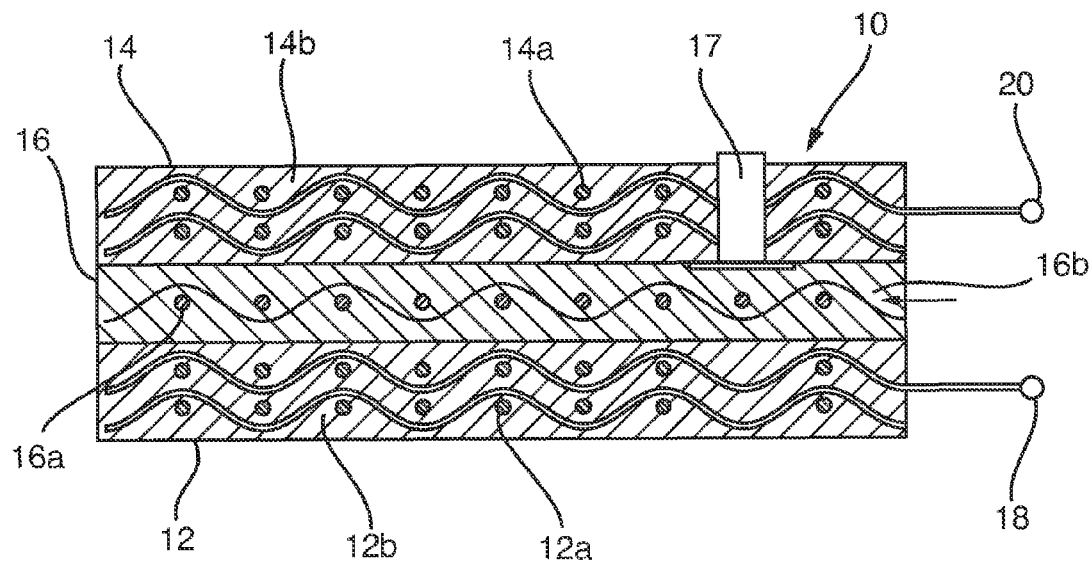
FIG. 2 shows a cross sectional side view of a rechargeable electrochemical cell.

FIG. 2 shows an example of a component integral with an alkaline rechargeable battery, depicted generally at 10, comprising an anode structure 12 which is spaced apart from a cathode structure 14 by a separator structure 16. A fluidic port 17 is located in the cathode layer 14, such that electrolyte may be flowed into the separator structure 16. The anode and cathode structures 12, 14 may be connected to suitable electrode contacts 18, 20 to permit charging and discharging of the cell in the usual manner, although, as explained in more detail below, the anode and cathode structures 12, 14 may act fully as current collectors.

Each of the anode and cathode structures 12, 14 and the separator structure 16 are formed as a composite material comprising suitable fibres in a binder matrix 12b, 14b. The anode and cathode structures 12, 14 comprise electrically conductive fibres 12a, 14a in respective binder matrices 12b, and 14b. The separator structure 16 comprises electrically insulating fibres 16a in a binder matrix 16b.

A representative example of a component of the invention integral with an alkaline battery in the form of a nickel-zinc battery will now be described, in which epoxy resin is used as the binder matrix throughout the device. The anode structure 12 is formed from a plain weave carbon fibre fabric 12a embedded in the binder matrix 12b. The binder matrix 12b also contains porous carbon powder and nickel hydroxide (Ni(OH)$_2$) powder, all of which is mixed thoroughly prior to use. The carbon fibre fabric forms a convenient current collector.

The cathode structure 14 is formed from a plain weave carbon fibre fabric 14a embedded in the binder matrix 14b. The binder matrix 14b also contains porous carbon powder and zinc oxide (ZnO) powder, all of which is mixed thoroughly prior to use. Typically, the number of moles of zinc oxide used is approximately half that of the nickel hydroxide, in view of the stoichiometry of the electrochemical reaction. The electrochemistry of the nickel zinc battery will be well known to the skilled reader, and therefore further details are not provided herein. The carbon fibre fabric forms a convenient current collector.

The active additives in the anode and cathode structures (the nickel hydroxide, zinc oxide and carbon powder) are typically present as fine powders having particle sizes in the range 1 to 10 µm.

The separator structure 16 is formed from a plain weave E-glass fabric 16a embedded in the binder matrix 16b. Other electrically insulating fibres such as silicon carbide which provide suitable structural reinforcement might be used instead. Other separators such as microporous polymer films may be used in combination with the glass fabric. The separator structure 16 contains an aqueous electrolyte consisting of 40% by weight potassium hydroxide in deionised water. Zinc oxide is dissolved in this solution until saturation or near saturation is achieved. The electrolyte is passed in via the fluidic port 17.

The electrolyte can be accommodated in a number of ways. The separator structure may be partially bonded in order to provide spaces which can be filled by the electrolyte. The electrolyte is retained by capillary action between fibres. A 30 to 40% degree of bonding is suitable for this purpose. A porous additive, such as a silica or a silica gel, may be used to provide a more open cell structure or a microporous polymer film may be employed. The fluidic port may, after filling the device, be fitted with a vent system (not shown) to control the release of gases during overcharge conditions. The fluidic port 17 permits the ready introduction and removal of the aqueous electrolyte for maintenance or storage.

Figure 3:
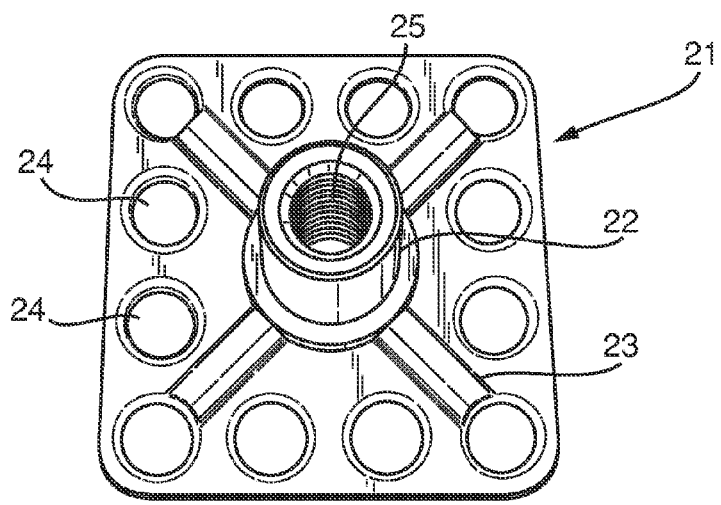
FIG. 3 shows a top view of a fluidic port, formed from a female threaded bonding fastener.

FIG. 3 shows a top view of a female bonded fastener 21, which may be used as a fluidic port. The faster comprises a base portion 23 with a plurality of holes 24, which allow the fabric plys to be sewn or fastened to the holes 24, and further increase the surface area available for bonding with the binder. The collar portion 22 extends up from the base portion 23. The collar 22 serves as the chamber through which the electrolyte can pass. The collar 22 may optionally be threaded 25 such that sealing caps, filling attachments, vent systems can be easily engaged with the fluidic port 21.

FIG. 4 shows a test rig 30, wherein a fibre reinforced polymer composite 32, is layered up with two fluidic ports 31a, 31b (of the type in FIG. 3), into a central cavity 33, such that fluid may be passed between fluidic ports 31a and 31b.

The first and second electrodes and separator structures are not necessarily planar. Non-planar configurations may be employed, for example, to provide a curved or even a generally tubular device structure, or to provide devices which can be shaped to any currently existing shaped panel. The structures of the invention are well suited for such configurations.

The invention claimed is:

1. A structural composite electrical energy storage device comprising:
   a first electrode structure;
   a second electrode structure; and
   a separator structure, said structures being encapsulated in
      a binder matrix to form a composite, wherein the separator structure separates the first and second electrode structures respectively, wherein said device comprises at least one void between said first and second electrode structures, said void being fillable with an electrolyte, wherein at least one of the first and second electrodes comprises at least one fluidic port, the fluidic port being integral with at least one ply of a fabric within the composite energy storage device.

2. A device according to claim 1, wherein the device comprises at least two fluidic ports.

3. A device according to claim 1, wherein the device comprises a vent system.

4. A device according to claim 3 wherein the vent system is a gas permeable membrane.

5. A device according to claim 1, wherein the separator structure is formed from a composite material which includes electrically insulating fibers in a binder matrix.

6. A device according to claim 1, wherein the electrolyte is a liquid or a gel.

7. A device according to claim 1, wherein the energy storage device is a composite battery or a composite supercapacitor.

8. A device according to claim 1, wherein the first and second electrode structures form anode and cathode structures to form a composite battery, and further comprise nickel-zinc, nickel-iron, nickel-cadmium, nickel metal hydride, lead acid or silver-zinc, or Li-ion electrochemically active materials.

9. A device according to claim 1, wherein one or more of the first and second electrode structures contains a porous additive which increases access of the electrolyte into said structure.

10. A device according to claim 9, wherein the separator structure contains a porous additive which increases access of the electrolyte into said structure.

11. A method of manufacturing a device, said method comprising:
    providing a first electrode structure, a second electrode structure, and a separator structure;
    providing a fluidic port in the separator structure, the fluidic port being integral with at least one ply of a fabric within the composite energy storage device;
    laying up on either side of the separator structure the first and second electrode structures, so that the separator structure separates the first and second electrode structures respectively, at least one void being provided between the first and second electrode structures, said void being fillable with an electrolyte through the fluidic port;
    curing the separator structure and electrode structures so that they are encapsulated in a binder matrix to form a composite; and
    filling the void with electrolyte via the fluidic port.

12. The method of claim 11, further comprising fitting a gas permeable membrane to the fluidic port.

13. A panel on a vehicle vessel or craft, said panel comprising a structural composite energy storage device, said structural composite energy storage device including:
    a first electrode structure;
    a second electrode structure; and
    a separator structure, said structures being encapsulated in a binder matrix to form a composite, wherein the separator structure separates the first and second electrode structures respectively, wherein said device comprises at least one void between said first and second electrode structures, said void capable of being filled with an electrolyte, wherein at least one of the first and second electrodes comprises at least one fluidic port, the fluidic port being integral with at least one ply of a fabric within the composite energy storage device.

* * * * *